United States Patent
Kim et al.

(10) Patent No.: US 11,177,842 B1
(45) Date of Patent: Nov. 16, 2021

(54) RADIO-FREQUENCY SWITCHING CIRCUIT WITH DAMAGE DETECTION OF DC BLOCKING CAPACITOR

(71) Applicant: Samsung Electro-Mechanics Co., Ltd., Suwon-si (KR)

(72) Inventors: Jong Myeong Kim, Suwon-si (KR); Ju Young Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/987,539

(22) Filed: Aug. 7, 2020

(30) Foreign Application Priority Data

May 15, 2020 (KR) .................. 10-2020-0058358

(51) Int. Cl.
*H04B 1/44* (2006.01)
*H04B 1/00* (2006.01)

(52) U.S. Cl.
CPC ............ *H04B 1/0078* (2013.01); *H04B 1/44* (2013.01)

(58) Field of Classification Search
CPC ......... H04B 1/0078; H04B 1/44; H04B 1/006
See application file for complete search history.

(56) References Cited

U.S. PATENT DOCUMENTS

| | | | |
|---|---|---|---|
| 2007/0218944 A1* | 9/2007 | Lin | ............... H03G 1/0088 455/557 |
| 2008/0238383 A1 | 10/2008 | Watanabe et al. | |
| 2010/0201449 A1 | 8/2010 | Hasegawa | |
| 2011/0201281 A1* | 8/2011 | Bakalski | ............... H04B 1/48 455/73 |
| 2021/0194125 A1* | 6/2021 | Bellaouar | ............... H03F 1/086 |

FOREIGN PATENT DOCUMENTS

| | | |
|---|---|---|
| JP | 2008-236863 A | 10/2008 |
| JP | 2010-183473 A | 8/2010 |
| JP | 2010-212784 A | 9/2010 |
| KR | 10-2010-0097321 A | 9/2010 |

\* cited by examiner

*Primary Examiner* — Tuan Pham
(74) *Attorney, Agent, or Firm* — NSIP Law

(57) ABSTRACT

A radio-frequency switching circuit includes a first switching circuit connected between a common capacitor connected to an antenna port and a first capacitor connected to a first port, and performing a switching operation with a first gate voltage transmitted through a first gate terminal, a voltage generation circuit supplying a drain-source voltage to a common node disposed at a first end of the first switching circuit, and a voltage detection circuit receiving a node voltage from the common node, comparing the node voltage with a reference voltage, and generating a detection voltage including damage information regarding the common capacitor or the first capacitor.

19 Claims, 9 Drawing Sheets

RADIO-FREQUENCY SWITCHING CIRCUIT WITH DAMAGE DETECTION OF DC BLOCKING CAPACITOR

CROSS-REFERENCE TO RELATED APPLICATION(S)

This application claims the benefit under 35 USC § 119(a) of Korean Patent Application No. 10-2020-0058358 filed on May 15, 2020 in the Korean Intellectual Property Office, the entire disclosure of which is incorporated herein by reference for all purposes.

BACKGROUND

1. Field

The following description relates to a radio-frequency switching circuit with a damage detecting DC blocking capacitor.

2. Description of Related Art

Typically, wireless communication terminals may include a radio-frequency switching circuit that switches a transmission (TX) signal and a reception (RX) signal between antennas and a plurality of ports.

Typically, a radio-frequency switching circuit may include one series switch, but may usually include a plurality of series switches, and each of the plurality of series switches may include a plurality of transistors (e.g., FETs) connected to each other in series.

In the example of existing radio-frequency switching circuits, in order to achieve stable operations of a transmission (Tx) mode power amplifier, as well as to improve basic characteristics of the switch (e.g., insertion loss, isolation, linearity, etc.), a negative voltage may be supplied to gates of a plurality of transistors included in the switch.

To generate such a negative voltage, an additional circuit such as a charge pump and an oscillator may be necessary. This increases not only the chip area, but may also take a long time to drive, resulting in a relatively long switching time period and additional current consumption.

To solve this existing disadvantage, typical radio-frequency switching circuits may have a structure that obtains an effect of providing a drain-source voltage (Vds) (e.g., 2.5V), which is a voltage higher than 0V, to a signal node to which sources or drains of a plurality of transistors are connected, and may supply a negative voltage to a gate terminal when a gate voltage supplied to gates of the plurality of transistors is 0V.

As described above, the radio-frequency switching circuit that uses the drain-source voltage, may supply the drain-source voltage (Vds) to the signal node, such that a capacitor blocking the DC voltage at each port may be connected.

However, when the capacitor is damaged by a high voltage (e.g., destruction by a static voltage), the DC voltage cannot be blocked, and thus, an improvement due to the use of the negative voltage, may not be achieved, which may particularly affect the linearity characteristic, and substantially deteriorate performance during an operation in the Tx mode.

To address this problem, it may be necessary to detect that the capacitor is broken or damaged.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a radio-frequency switching circuit includes a first switching circuit, connected between a common capacitor connected to an antenna port and a first capacitor connected to a first port, and configured to perform a switching operation with a first gate voltage transmitted through a first gate terminal, a voltage generation circuit, configured to supply a drain-source voltage to a common node disposed at a first end of the first switching circuit; and a voltage detection circuit configured to receive a node voltage from the common node, compare the received node voltage with a reference voltage, and generate a detection voltage including damage information regarding one or more of the common capacitor and the first capacitor.

The radio-frequency switching circuit may include a first logic circuit, configured to control a level of the first gate voltage of the first switching circuit, based on the detection voltage; and a first drain-source (DS) resistor connected between the common node and a second end of the first switching circuit.

The voltage detection circuit may include a comparator, configured to output the detection voltage having a first level when the node voltage is higher than the reference voltage, and configured to output the detection voltage having a second level when the node voltage is lower than the reference voltage.

The drain-source voltage may be lower than a high level of the first gate voltage, and higher than a low level of the first gate voltage.

The radio-frequency switching circuit may further include at least a second switching circuit among the second switching circuit to an n-th switching circuit, where n is a natural number of 2 or more, wherein the second switching circuit may be connected between the common capacitor and a second capacitor connected to a second port, and the second switching circuit may be configured to perform a switching operation with a second gate voltage supplied through a second gate terminal, and wherein the n-th switching circuit may be connected between the common capacitor and an n-th capacitor connected to an n-th port, and the n-th switching circuit may be configured to perform a switching operation with an n-th gate voltage supplied through an n-th gate terminal.

The first logic circuit may include a first AND gate, configured to perform a logical product operation on the detection voltage and a first control voltage to generate the first gate voltage, and output the generated first gate voltage to the first gate terminal.

The radio-frequency switching circuit may further include a first bypass shunt circuit connected between the first end or a second end of the first switching circuit and a ground, and configured to perform a switching operation based on the detection voltage.

The first bypass shunt circuit may include a plurality of transistors stacked in series with each other, and configured to perform a switching operation based on the detection voltage.

In a general aspect, a radio-frequency switching circuit includes first to n-th switching circuits connected to a common node in parallel to each other, the common node being connected to a common capacitor, where n is a natural number of 2 or more; a voltage generation circuit, configured to supply a drain-source voltage to the common node; a voltage detection circuit, configured to receive a node voltage from the common node, and compare the received node voltage with a reference voltage to generate a detection voltage including damage information regarding a direct current (DC) blocking capacitor including the common capacitor; and first to n-th logic circuits, configured to control voltage levels of the first to n-th gate voltages of the first to n-th switching circuits, respectively, based on the detection voltage.

The first switching circuit may be connected between the common capacitor and a first capacitor connected to a first port, and may be configured to perform a switching operation with a first gate voltage supplied through a first gate terminal, and the n-th switching circuit may be connected between the common capacitor and an n-th capacitor connected to an n-th port, and is configured to perform a switching operation with an n-th gate voltage supplied through an n-th gate terminal.

The radio-frequency switching circuit may further include first to n-th DS resistors connected between a first end and a second end of the first to n-th switching circuits, respectively.

The voltage detection circuit may include a comparator configured to output a detection voltage having a first level when the node voltage is higher than the reference voltage, and configured to output the detection voltage having a second level when the node voltage is lower than the reference voltage.

The drain-source voltage may be a voltage lower than a high level of the first gate voltage, and higher than a low level of the first gate voltage.

The first logic circuit may include a first AND gate, configured to perform a logical product operation on the detection voltage and a first control voltage to generate the first gate voltage and output the first gate voltage to the first gate terminal, and the n-th logic circuit may include an n-th AND gate, configured to perform a logical product operation on the detection voltage and an n-th control voltage to generate the n-th gate voltage and output the n-th gate voltage to the n-th gate terminal.

The radio-frequency switching circuit may include a first bypass shunt circuit to an n-th bypass shunt circuit, wherein the first bypass shunt circuit may be connected between a first end or a second end of the first switching circuit and a ground, and may be configured to perform a switching operation based on the detection voltage, and the n-th bypass shunt circuit is connected between the first end or the second end of the n-th switching circuit and the ground, and may be configured to perform a switching operation based on the detection voltage.

The first bypass shunt circuit may include a plurality of transistors stacked with each other in series, and may be configured to perform a switching operation based on the detection voltage, and the n-th bypass shunt circuit may include a plurality of transistors stacked in series with each other, and may be configured to perform a switching operation based on the detection voltage.

In a general aspect, a communication terminal includes a radio-frequency switching circuit includes a switching circuit connected between a common capacitor and a first capacitor; a voltage generator circuit, configured to supply a drain-source voltage to a common node; a comparator, configured to compare a node voltage from the common node with a reference voltage, and generate a detection voltage including damage information related to the common capacitor or the first capacitor; and a bypass shunt circuit configured to perform a switching operation based on the detection voltage.

The damage information may be determined based on a level of the node voltage.

The operational information may indicate whether one or more of the common capacitor and the first capacitor is damaged.

Other features and aspects will be apparent from the following detailed description, the drawings, and the claims.

Figure 1:
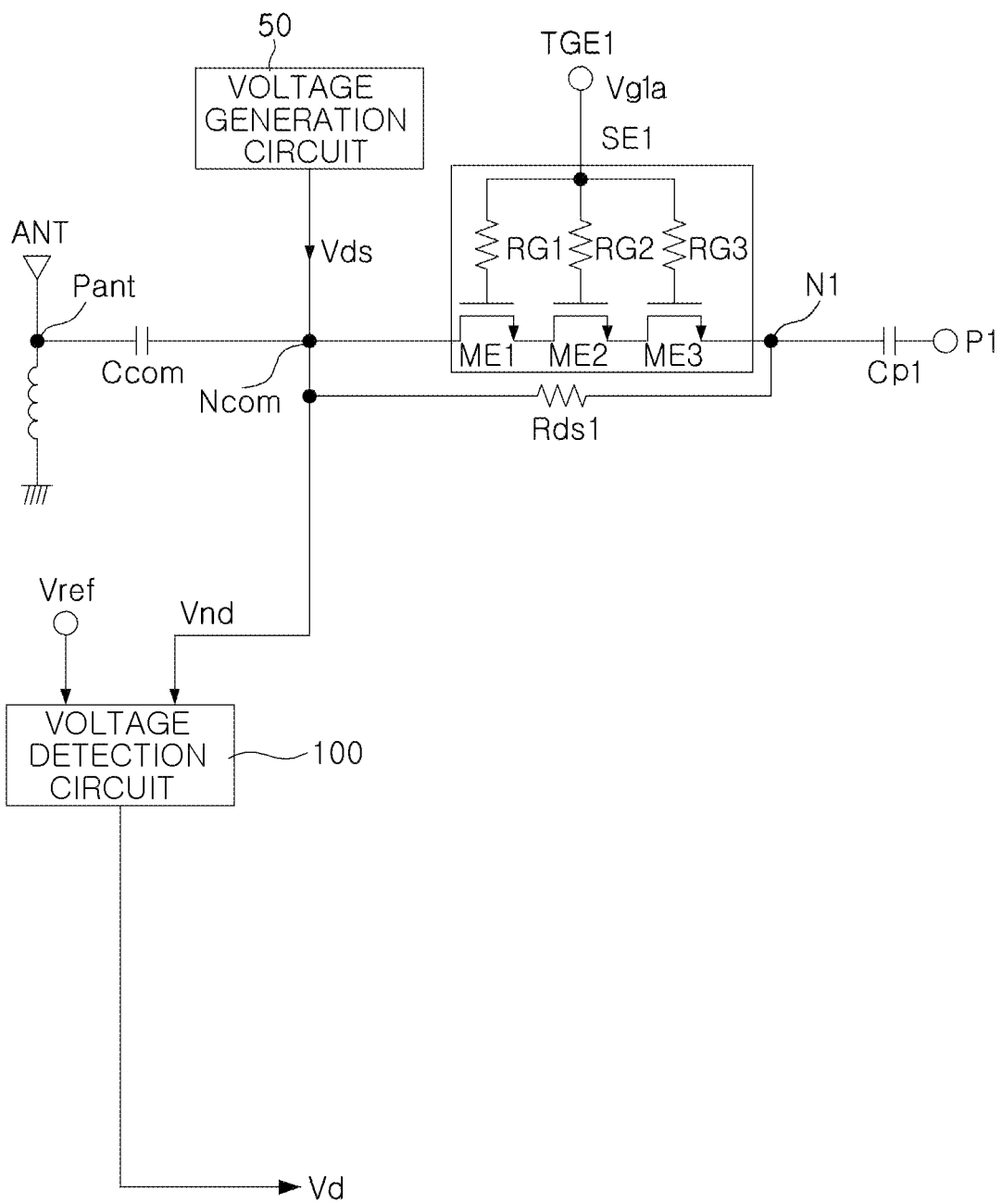
FIG. 1 illustrates an example radio-frequency switching circuit, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 2:
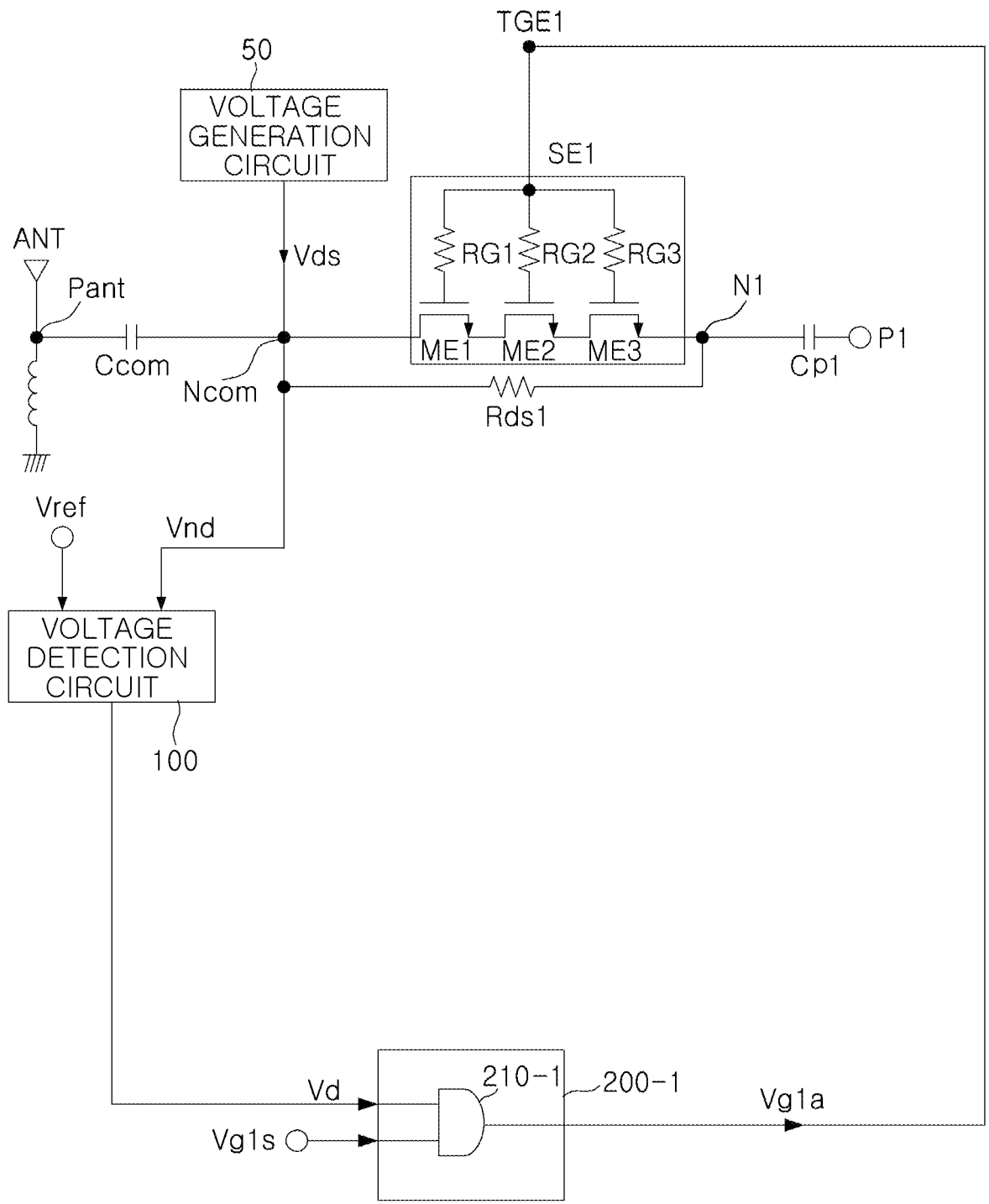
FIG. 2 illustrates an example radio-frequency switching circuit, in accordance with one or more embodiments.

FIG. 1 illustrates an example radio-frequency switching circuit, in accordance with one or more embodiments, and FIG. 2 illustrates an example radio-frequency switching circuit according to another example, in accordance with one or more embodiments.

Referring to FIGS. 1 and 2, a radio-frequency switching circuit 10, in accordance with one or more embodiments, may include a first switching circuit SE1, a voltage generation circuit 50, and a voltage detection circuit 100.

Additionally, the radio-frequency switching circuit may include a first drain-to-source (DS) resistor Rds1.

In an example, the first switching circuit SE1 may be connected between a common capacitor, Ccom, connected to an antenna port $P_{ant}$ and a first capacitor Cp1 connected to a first port P1, and may perform a switching operation with a first gate voltage Vg1$a$ supplied through a first gate terminal TGE1. In an example, an antenna ANT may be connected to the antenna port $P_{ant}$, and a transmission circuit or a reception circuit may be connected to the first port P1.

The voltage generation circuit 50 may supply a drain-source voltage Vds to a common node Ncom.

The voltage detection circuit 100 may receive a node voltage Vnd from the common node Ncom, may compare the node voltage Vnd to a reference voltage Vref, and may generate a detection voltage Vd including operational information or deterioration information or damage information regarding an operational state or a performance state of the common capacitor Ccom or the first capacitor Cp1. In an example, damage to the common capacitor Ccom or the first capacitor Cp1 may mean or refer to a loss of function, such as destruction of the common capacitor Ccom or the first capacitor Cp1, and when destroyed, the signal node may be connected to ground, so that the direct current (DC) voltage of the signal node may have a ground level.

In an example, the drain-source voltage Vds may be lower than a high level of the first gate voltage Vg1$a$ and higher than a low level of the first gate voltage Vg1$a$. For example, when the high-level voltage of the first gate voltage Vg1$a$ is 5V and the low level voltage of the first gate voltage Vg1$a$ is 0V, the drain-source voltage Vds may be a voltage lower than 5V and higher than 0V, and for example, may have a value of 2.5V.

To block a DC of the drain-source voltage Vds, the common capacitor Ccom and the first capacitor Cp1 connected to both ends of the first switching circuit SE1, may be included.

The common capacitor Ccom is connected between the antenna port $P_{ant}$ and the first switching circuit SE1, and the first capacitor Cp1 is connected between the first switching circuit SE1 and the first port P1.

The first DS resistor Rds1 is connected between the common node Ncom and a second end N1 of the first switching circuit SE1. In an example, the first DS resistor Rds1 is connected between both ends of the first switching circuit SE1, to enable the drain-source voltage Vds to be applied to both ends of the first switching circuit SE1.

Referring to FIG. 2, the radio-frequency switching circuit 10 may further include a first logic circuit 200-1 in addition to the radio-frequency switching circuit 10 of FIG. 1.

The first logic circuit 200-1 may control a level of the first gate voltage Vg1$a$ supplied to the gate terminal TGE1 of the first switching circuit SE1, based on the detection voltage Vd and a received first control voltage Vg1S.

For respective drawings of the present examples, unnecessary duplicate descriptions may be omitted for the same reference numerals and components having the same function, and details of differences for the drawings may be described.

Figure 3:
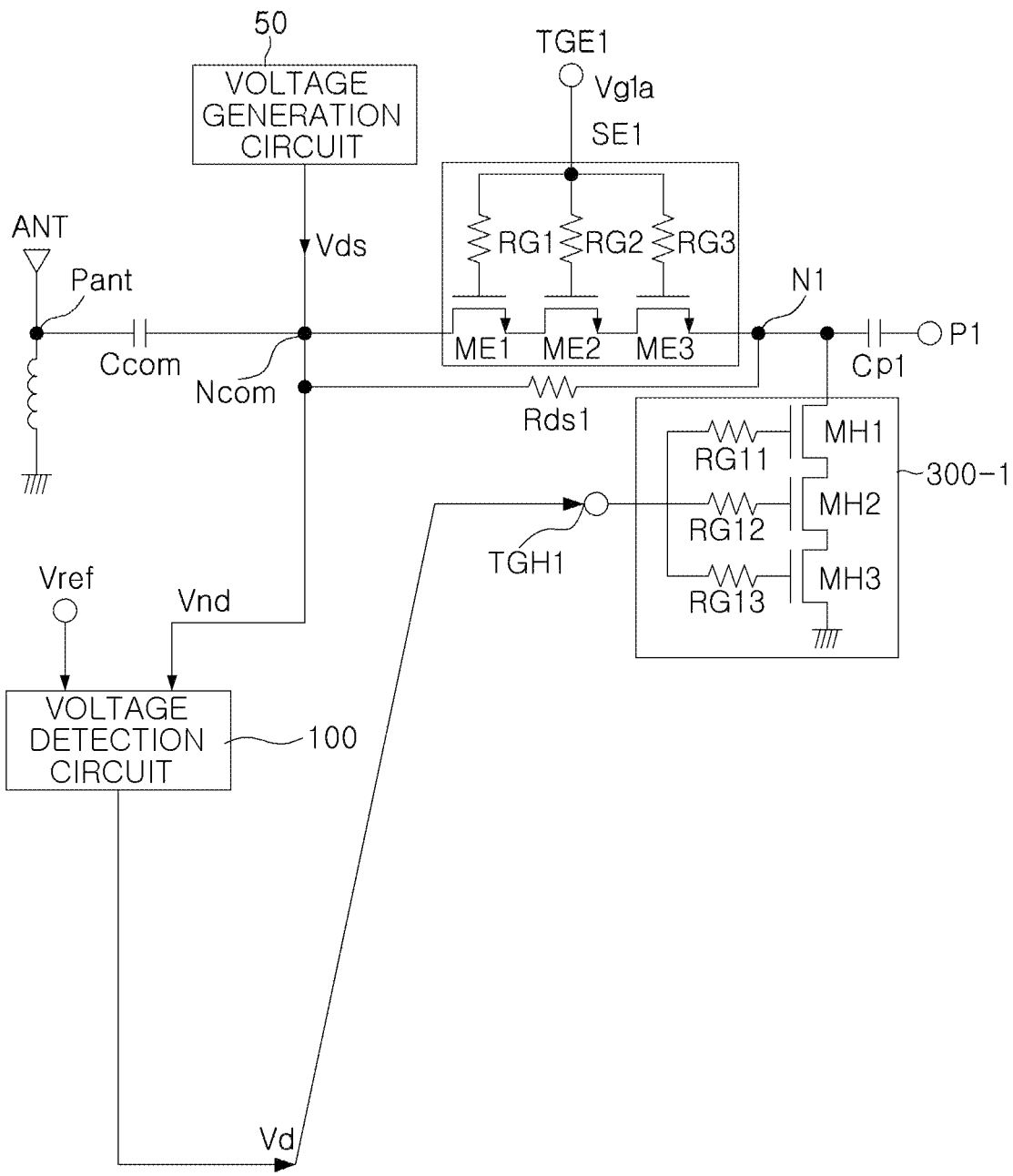
FIG. 3 illustrates an example radio-frequency switching circuit, in accordance with one or more embodiments.
Figure 4:
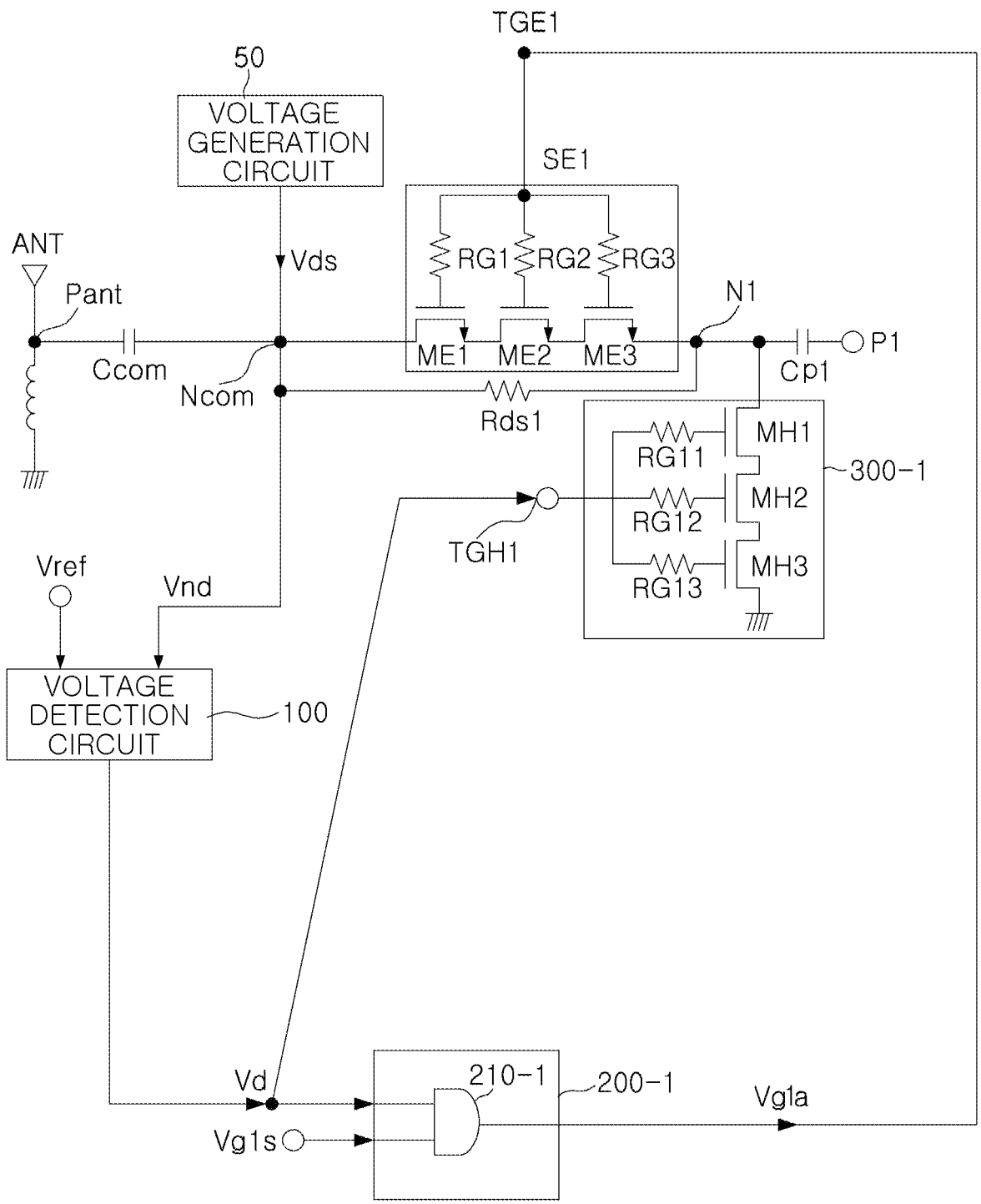
FIG. 4 illustrates an example radio-frequency switching circuit, in accordance with one or more embodiments.

FIG. 3 illustrates an example radio-frequency switching circuit, in accordance with one or more embodiments, and FIG. 4 illustrates an example radio-frequency switching circuit, in accordance with one or more embodiments.

The radio-frequency switching circuit illustrated in FIGS. 3 and 4 may further include a first bypass shunt circuit 300-1 in addition to the radio-frequency switching circuit 10 of FIG. 1.

The radio-frequency switching circuit illustrated in FIG. 4 may further include a first logic circuit 200-1 in the radio-frequency switching circuit of FIG. 3.

Referring to FIGS. 3 and 4, the first bypass shunt circuit 300-1 is connected between a first end or a second end of the first switching circuit SE1 and a ground, and may perform a switching operation based on the detection voltage Vd.

In an example, when the voltage detection circuit 100 determines or detects a problem with the common capacitor Ccom or the first capacitor Cp1 by checking the state of the drain-source voltage based on the node voltage Vnd, the voltage detection circuit 100 may turn on the first bypass shunt circuit 300-1, to bypass a signal through the signal path of the first switching circuit SE1 to the ground. The first logic circuit 200-1 may supply the first gate voltage Vg1a, of which the level is adjusted, to the first switching circuit SE1, based on the detection voltage Vd and the input first control voltage Vg1s.

In an example, the first switching circuit SE1 may include a plurality of transistors ME1, ME2 and ME3 connected to each other in series. Although only three transistors are illustrated, this is only an example, and the number of transistors may be more or less than three, based on the examples. The plurality of transistors ME1, ME2 and ME3 may receive the first gate voltage Vg1a of which the level has been regulated through gate resistors RG1, RG2 and RG3 connected to the respective gates of the transistors ME1, ME2 and ME3.

In an example, the first bypass shunt circuit 300-1 may include a plurality of transistors MH, MH2 and MH3 connected to each other in series. Although only three transistors are illustrated, this is only an example, and the number of transistors may be more or less than three, based on the examples. The plurality of transistors MH1, MH2 and MH3 may receive the detection voltage Vd through gate resistors RG11, RG12 and RG13 connected to the respective gates of the transistors MH, MH2 and MH3.

In an example, the voltage detection circuit 100 may include a comparator. The comparator may compare the node voltage Vnd and the reference voltage Vref, and may output the detection voltage Vd having a voltage level based on a result of the comparison.

In an example, the first logic circuit 200-1, as illustrated in FIG. 4, may include a first AND gate 210-1. The first AND gate 210-1 generates the first gate voltage Vg1a by performing a logical multiplication of the detection voltage Vd and the first control voltage Vg1s to generate the first gate voltage Vg1a, and may output the generated first gate voltage Vg1a to the first gate terminal TGE1.

Figure 5:
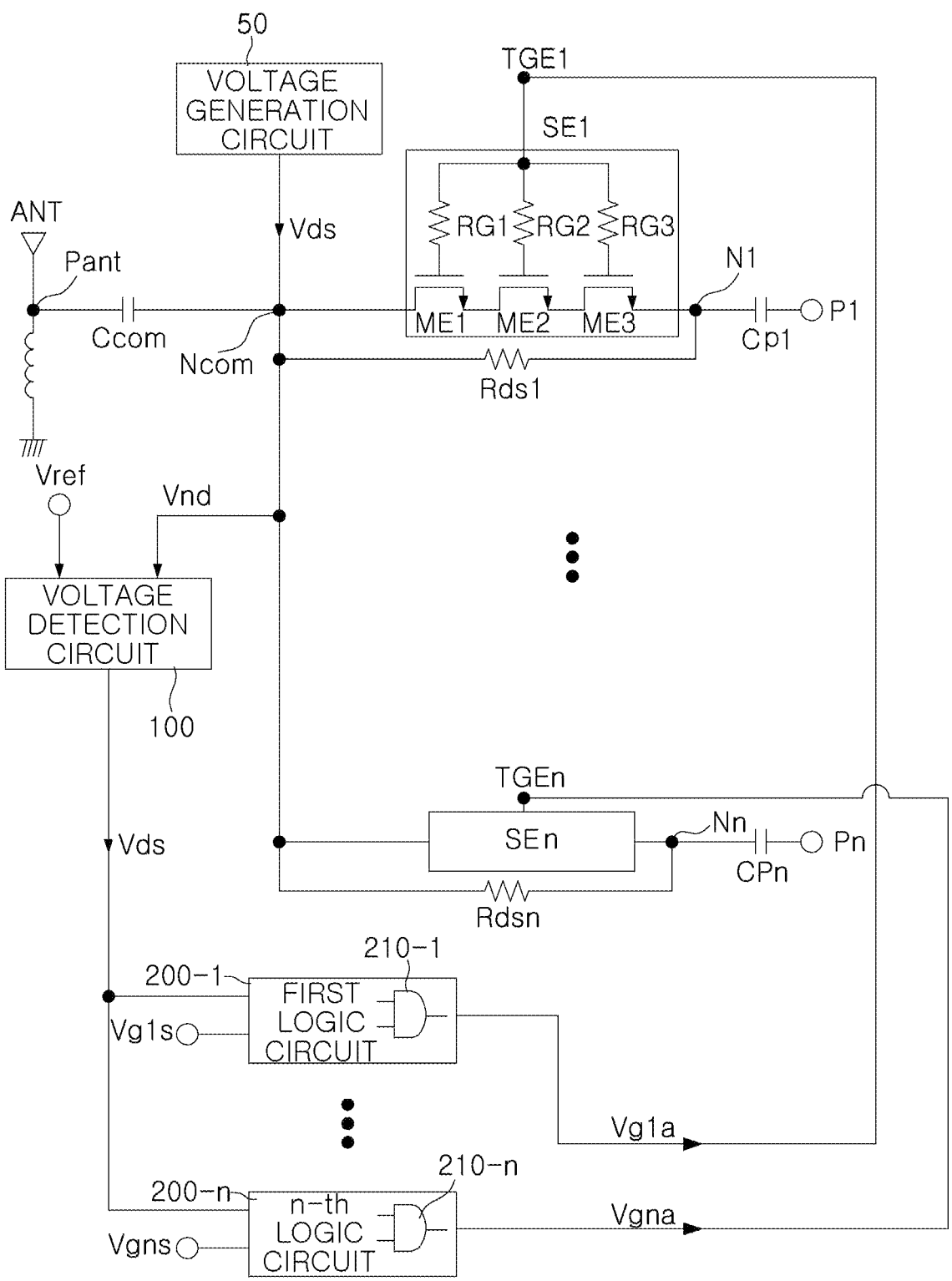
FIG. 5 illustrates an example radio-frequency switching circuit, in accordance with one or more embodiments.
Figure 6:
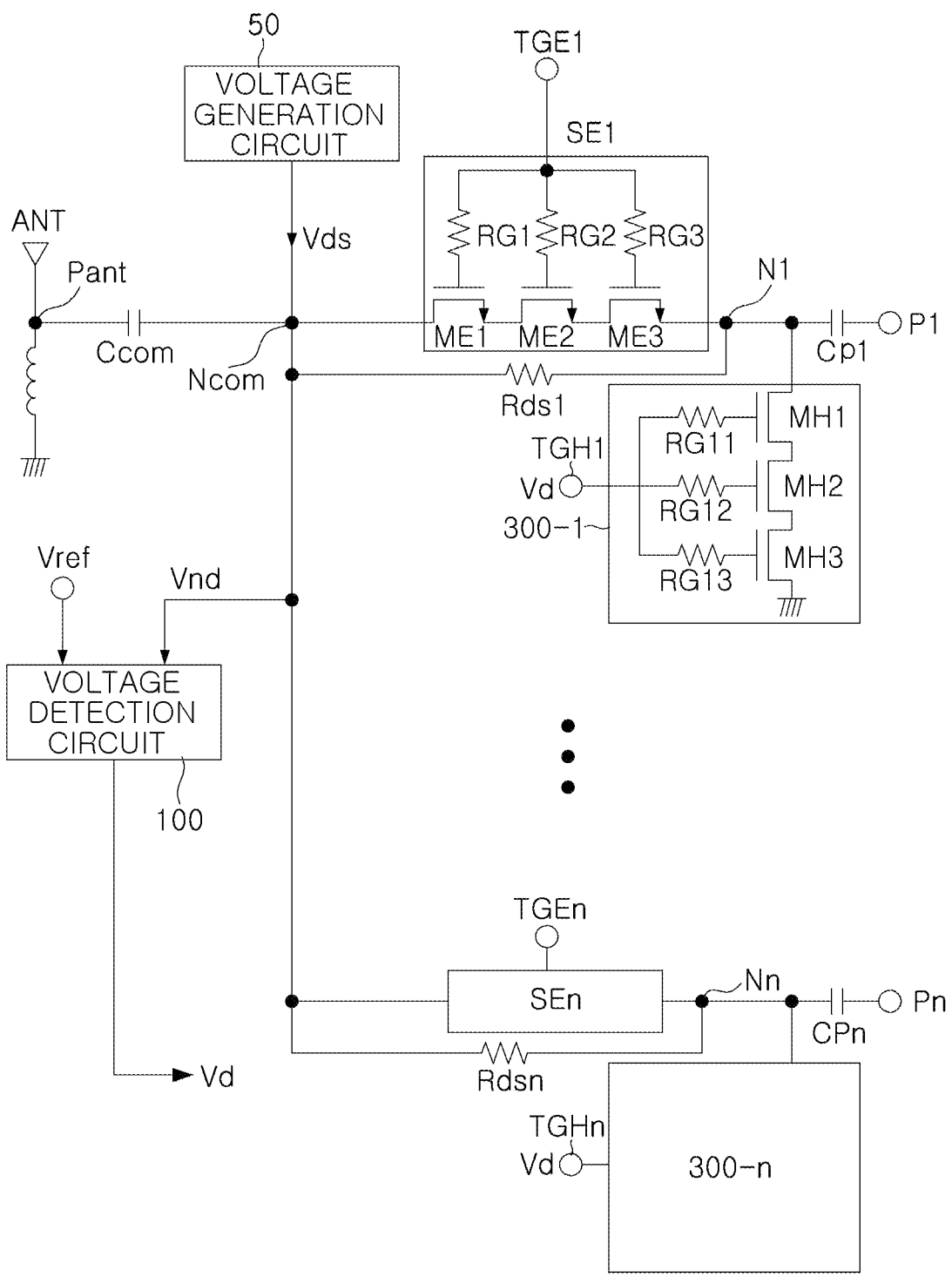
FIG. 6 illustrates an example radio-frequency switching circuit, in accordance with one or more embodiments.
Figure 7:
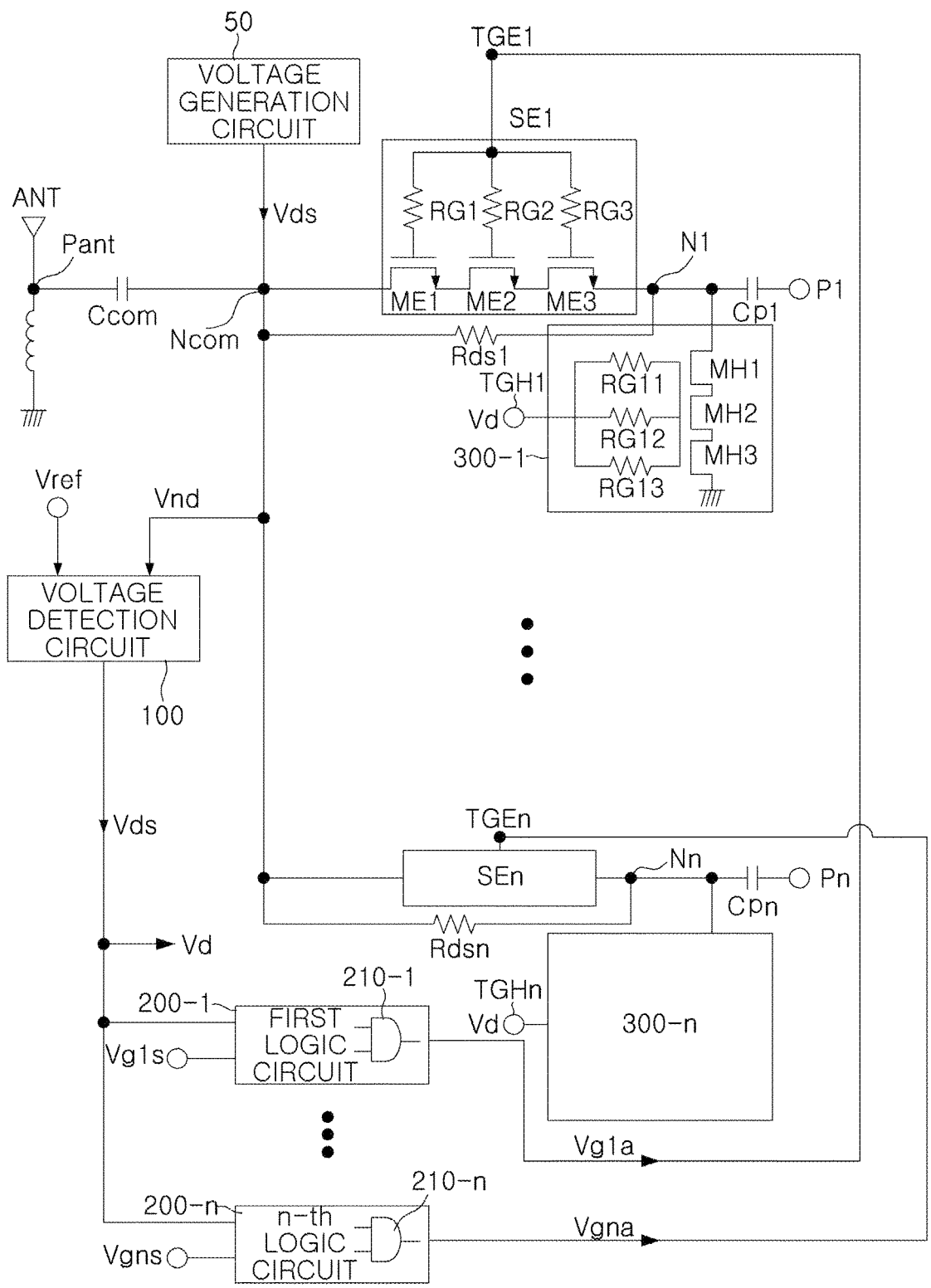
FIG. 7 illustrates an example radio-frequency switching circuit, in accordance with one or more embodiments.

FIG. 5 illustrates an example radio-frequency switching circuit, in accordance with one or more embodiments, and FIG. 6 illustrates an example radio-frequency switching circuit, in accordance with one or more embodiments. FIG. 7 illustrates an example radio-frequency switching circuit, in accordance with one or more embodiments.

Referring to FIGS. 5, 6, and 7, an example radio-frequency switching circuit, in accordance with one or more embodiments may include a voltage generation circuit 50, a first switching circuit SE1, second to n-th (where n is a natural number of two or more) switching circuit SEn, first DS resistor Rds1 to n-th DS resistor Rdsn, a voltage detection circuit 100, and a first bypass shunt circuit 300-1.

The first switching circuit SE1 is connected between a common capacitor Ccom connected to an antenna port $P_{ant}$ and a first capacitor Cp1 connected to a first port P1, and may perform a switching operation with a first gate voltage Vg1a supplied through a first gate terminal TGE1.

The n-th switching circuit SEn is connected between the common capacitor Ccom and an n-th capacitor Cpn connected to an n-th port Pn, and may perform a switching operation with an n-th gate voltage Vgna received through an n-th gate terminal TGEn.

The voltage generation circuit 50 may supply a drain-source voltage Vds to a common node Ncom.

To block DC of the drain-source voltage Vds, the common capacitor Ccom and the first capacitor Cp1, connected to both ends of the first switching circuit SE1, may be included. Additionally, an n-th capacitor Cpn connected to a second end of the n-th switching circuit SEn may be included. In an example, the common capacitor Ccom and the first capacitor Cp1 are connected to both ends of the first switching circuit SE1, and the common capacitor Ccom and the n-th capacitor Cpn are connected to both ends of the n-th switching circuit SEn.

The common capacitor Ccom is connected between the antenna port $P_{ant}$ and the first switching circuit SE1, and the first capacitor Cp1 is connected between the first switching circuit SE1 and the first port P1. Additionally, the n-th capacitor Cpn is connected between the n-th switching circuit SEn and the n-th port Pn.

The first DS resistor Rds1 may be connected between the common node Ncom and a second end N1 of the first switching circuit SE1. The n-th DS resistor Rdsn may be connected between the common node Ncom and a second end Nn of the n-th switching circuit SEn.

Specifically, the first DS resistor Rds1 may be connected between both ends of the first switching circuit SE1, to enable the drain-source voltage Vds to be applied to both ends of the first switching circuit SE1. Additionally, the n-th DS resistor Rdsn may be connected between both ends of the n-th switching circuit SEn, to enable the drain-source voltage Vds to be applied to both ends of the n-th switching circuit SEn.

The voltage detection circuit 100 may receive a node voltage Vnd from a common node Ncom, may compare the node voltage Vnd with a reference voltage Vref, and may generate a detection voltage Vd including damage information or operational information pertaining to a state of the common capacitor Ccom or the first capacitor Cp1.

Referring to FIGS. 5 and 7, the radio-frequency switching circuit may include a first logic circuit 200-1 to an n-th logic circuit 200-n.

The first logic circuit 200-1 may control the level of the first gate voltage Vg1a of the first switching circuit SE1 based on the detection voltage Vd. The n-th logic circuit 200-n may control the level of the n-th gate voltage Vgna of the n-th switching circuit SEn, based on the detection voltage Vd.

In an example, the first logic circuit 200-1 may include a first AND gate 210-1. The first AND gate 210-1 generates the first gate voltage Vg1a by performing a logical multiplication of the detection voltage Vd and the first control voltage Vg1s, and may output the generated first gate voltage Vg1a to the first gate terminal TGE1.

The n-th logic circuit 200-n may include an n-th AND gate 210-n. The n-th AND gate 210-n generates the n-th gate voltage Vgna by performing a logical multiplication of the detection voltage Vd and the n-th control voltage Vgns, to output the generated n-th gate voltage Vgna to the n-th gate terminal TGEn.

Referring to FIGS. 6 and 7, the radio-frequency switching circuit may include a first bypass shunt circuit 300-1 to an n-th bypass shunt circuit 300-n.

The first bypass shunt circuit 300-1 may be connected between a first end Ncom or a second end N1 of the first switching circuit SE1 and a ground, and may perform a switching operation based on the detection voltage Vd. In an example, the first bypass shunt circuit 300-1 may perform a switching operation with the detection voltage Vd input through a first shunt gate terminal TGH1. In this example, when the detection voltage Vd is a high-level voltage, the first bypass shunt circuit 300-1 may be turned on, and when the detection voltage Vd is a low-level voltage, the first bypass shunt circuit 300-1 may be turned off.

Further, the n-th bypass shunt circuit 300-n is connected between a first end Ncom or a second end Nn of the n-th switching circuit SEn and the ground, and may perform a switching operation based on the detection voltage Vd. In an example, the n-th bypass shunt circuit 300-n may perform a switching operation according to the detection voltage Vd input through the n-th shunt gate terminal TGHn. In this example, when the detection voltage Vd is a high-level voltage, the n-th bypass shunt circuit 300-n may be turned on, and when the detection voltage Vd is a low-level voltage, the n-th bypass shunt circuit 300-n may be turned off.

The first bypass shunt circuit 300-1 may include a plurality of transistors MH1, MH2 and MH3 stacked with each other in series, and performing a switching operation based on the detection voltage Vd. The plurality of transistors MH1, MH2 and MH3 may receive the detection voltage Vd through gate resistors RG11, RG12 and RG13 connected to gates, respectively.

Further, the n-th bypass shunt circuit 300-n may also include a plurality of transistors, similarly to the first bypass shunt circuit 300-1.

Figure 8:
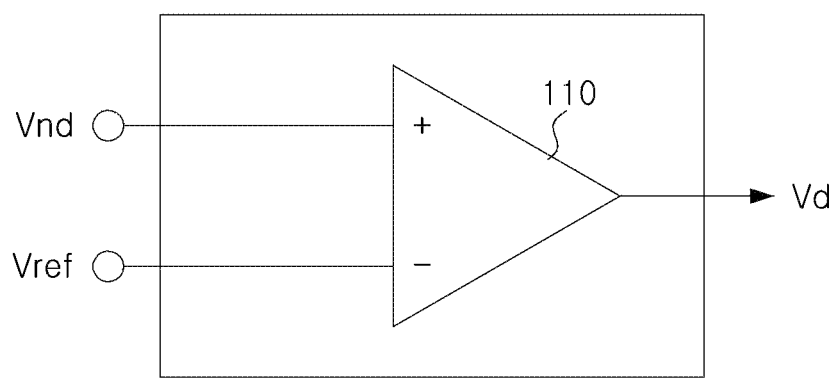
FIG. 8 illustrates an example voltage detection circuit, in accordance with one or more embodiments.

FIG. 8 illustrates an example voltage detection circuit, in accordance with one or more embodiments.

Referring to FIG. 8, the voltage detection circuit 100 may further include a comparator 110. When the node voltage Vnd is higher than the reference voltage Vref, the comparator 110 may output the detection voltage Vd having a first level, and when the node voltage Vnd is lower than the reference voltage Vref, the comparator 110 may output the detection voltage Vd having a second level.

In an example, when one or more of the first to n-th capacitors CP1 to CPn connected to respective ports are destroyed or damaged, damage to one or more of the first to n-th capacitors CP1 to CPn may be detected by detecting the DC voltage state of the signal node, using the principle that the drain-source voltage Vds is changed due to an externally used device and a connected configuration circuit.

Accordingly, the operation of the series switch may be controlled using the detection voltage Vd.

Figure 9:
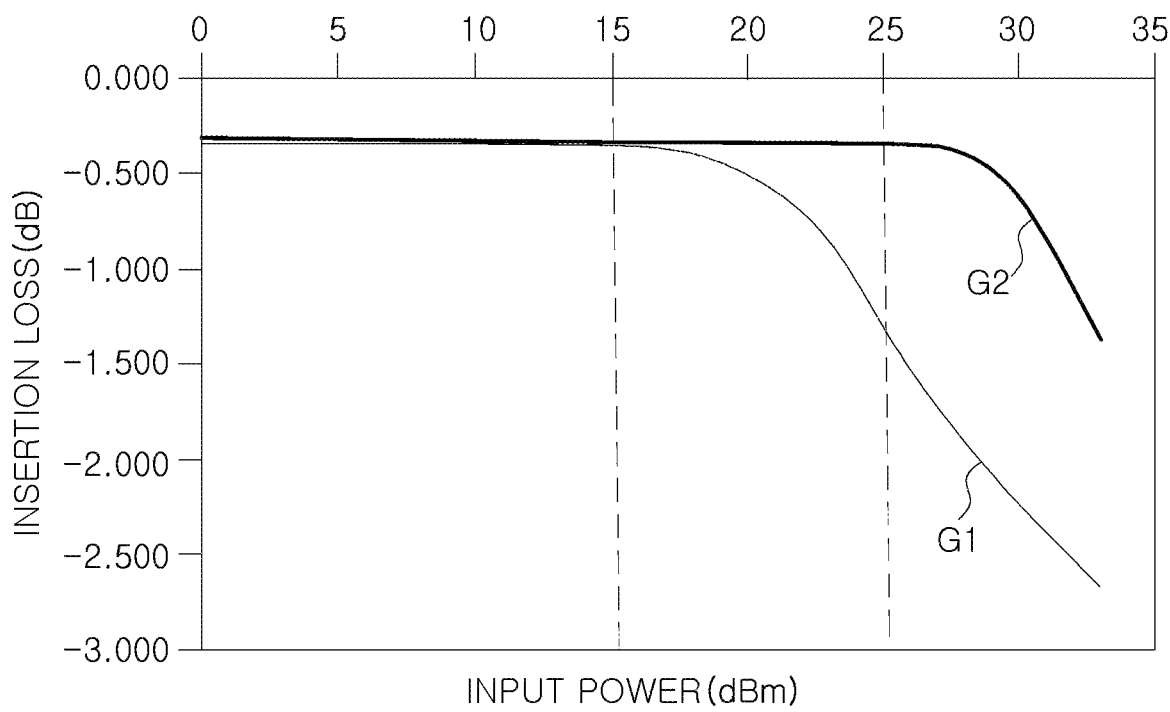
FIG. 9 is a graph illustrating input power-insertion loss depending on whether a DC drain-source voltage is supplied or not, in accordance with one or more embodiments.

FIG. 9 is a graph of input power-insertion loss depending on whether DC drain-source voltage is supplied or not.

In FIG. 9, G1 is a graph illustrating input power-insertion loss for an example in which a DC drain-source voltage Vds is not supplied, and G2 is a graph of input power-insertion loss for an example in which a DC drain-source voltage Vds is supplied.

Referring to G1 and G2 of FIGS. 9, G1 and G2 exhibit different insertion loss characteristics at 15 [dBm] or more depending on the presence or absence of supply of the DC drain-source voltage Vds.

On the other hand, when a DC blocking capacitor such as the common capacitor Ccom, the first to n-th capacitors CP1 to CPn, or the like, is damaged and thus the signal line to which the common connection node Ncom is connected is grounded, the insertion loss (dB) in G1 is lower than G2 at 25 [dBm] or more as illustrated in FIG. 9. Therefore, based on this point, a determination whether the DC blocking capacitor is damaged may be ascertained by observing the node voltage Vnd at the common node Ncom.

As set forth above, according to respective examples, by adding a detection circuit detecting the direct current (DC) voltage of a signal node, the normal operating state of a DC blocking capacitor may be simply checked at relatively low costs.

Additionally, the gate voltage of the corresponding series switch may be adjusted depending on the detection result of the DC voltage of the signal node, thereby controlling the operation of the corresponding series switch.

Further, the detection voltage based on the detection result of the DC voltage of the signal node may be supplied to a gate terminal of the corresponding bypass shunt circuit connected between the corresponding series switch and the ground, to control the operation of the bypass shunt circuit.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radio-frequency switching circuit comprising:
 a first switching circuit, connected between a common capacitor connected to an antenna port and a first capacitor connected to a first port, and configured to perform a switching operation with a first gate voltage transmitted through a first gate terminal;
 a voltage generation circuit, configured to supply a drain-source voltage to a common node disposed at a first end of the first switching circuit; and
 a voltage detection circuit configured to receive a node voltage from the common node, compare the received node voltage with a reference voltage, and generate a detection voltage including damage information regarding one or more of the common capacitor and the first capacitor.

2. The radio-frequency switching circuit of claim 1, further comprising:
 a first logic circuit, configured to control a level of the first gate voltage of the first switching circuit, based on the detection voltage; and
 a first drain-source (DS) resistor connected between the common node and a second end of the first switching circuit.

3. The radio-frequency switching circuit of claim 2, wherein the voltage detection circuit comprises a comparator, configured to output the detection voltage having a first level when the node voltage is higher than the reference voltage, and configured to output the detection voltage having a second level when the node voltage is lower than the reference voltage.

4. The radio-frequency switching circuit of claim 1, wherein the drain-source voltage is lower than a high level of the first gate voltage, and higher than a low level of the first gate voltage.

5. The radio-frequency switching circuit of claim 1, wherein the radio-frequency switching circuit further comprises at least a second switching circuit among the second switching circuit to an n-th switching circuit, where n is a natural number of 2 or more,
wherein the second switching circuit is connected between the common capacitor and a second capacitor connected to a second port, and the second switching circuit is configured to perform a switching operation with a second gate voltage supplied through a second gate terminal, and
wherein the n-th switching circuit is connected between the common capacitor and an n-th capacitor connected to an n-th port, and the n-th switching circuit is configured to perform a switching operation with an n-th gate voltage supplied through an n-th gate terminal.

6. The radio-frequency switching circuit of claim 1, wherein the first logic circuit comprises a first AND gate, configured to perform a logical product operation on the detection voltage and a first control voltage to generate the first gate voltage, and output the generated first gate voltage to the first gate terminal.

7. The radio-frequency switching circuit of claim 1, further comprising a first bypass shunt circuit connected between the first end or a second end of the first switching circuit and a ground, and configured to perform a switching operation based on the detection voltage.

8. The radio-frequency switching circuit of claim 7, wherein the first bypass shunt circuit comprises a plurality of transistors stacked in series with each other, and configured to perform a switching operation based on the detection voltage.

9. A radio-frequency switching circuit comprising:
first to n-th switching circuits connected to a common node in parallel to each other, the common node being connected to a common capacitor, where n is a natural number of 2 or more;
a voltage generation circuit, configured to supply a drain-source voltage to the common node;
a voltage detection circuit, configured to receive a node voltage from the common node, and compare the received node voltage with a reference voltage to generate a detection voltage including damage information regarding a direct current (DC) blocking capacitor including the common capacitor; and
first to n-th logic circuits, configured to control voltage levels of the first to n-th gate voltages of the first to n-th switching circuits, respectively, based on the detection voltage.

10. The radio-frequency switching circuit of claim 9, wherein the first switching circuit is connected between the common capacitor and a first capacitor connected to a first port, and is configured to perform a switching operation with a first gate voltage supplied through a first gate terminal, and
the n-th switching circuit is connected between the common capacitor and an n-th capacitor connected to an n-th port, and is configured to perform a switching operation with an n-th gate voltage supplied through an n-th gate terminal.

11. The radio-frequency switching circuit of claim 9, further comprising first to n-th DS resistors connected between a first end and a second end of the first to n-th switching circuits, respectively.

12. The radio-frequency switching circuit of claim 9, wherein the voltage detection circuit comprises a comparator configured to output a detection voltage having a first level when the node voltage is higher than the reference voltage, and configured to output the detection voltage having a second level when the node voltage is lower than the reference voltage.

13. The radio-frequency switching circuit of claim 9, wherein the drain-source voltage is a voltage lower than a high level of the first gate voltage, and higher than a low level of the first gate voltage.

14. The radio-frequency switching circuit of claim 9, wherein the first logic circuit comprises a first AND gate, configured to perform a logical product operation on the detection voltage and a first control voltage to generate the first gate voltage and output the first gate voltage to the first gate terminal, and
the n-th logic circuit comprises an n-th AND gate, configured to perform a logical product operation on the detection voltage and an n-th control voltage to generate the n-th gate voltage and output the n-th gate voltage to the n-th gate terminal.

15. The radio-frequency switching circuit of claim 14, further comprising a first bypass shunt circuit to an n-th bypass shunt circuit,
wherein the first bypass shunt circuit is connected between a first end or a second end of the first switching circuit and a ground, and is configured to perform a switching operation based on the detection voltage, and
the n-th bypass shunt circuit is connected between the first end or the second end of the n-th switching circuit and the ground, and is configured to perform a switching operation based on the detection voltage.

16. The radio-frequency switching circuit of claim 15, wherein the first bypass shunt circuit comprises a plurality of transistors stacked with each other in series, and is configured to perform a switching operation based on the detection voltage, and
the n-th bypass shunt circuit comprises a plurality of transistors stacked in series with each other, and configured to perform a switching operation based on the detection voltage.

17. A communication terminal comprising:
a radio-frequency switching circuit comprising:
a switching circuit connected between a common capacitor and a first capacitor;
a voltage generator circuit, configured to supply a drain-source voltage to a common node;
a comparator, configured to compare a node voltage from the common node with a reference voltage, and generate a detection voltage including operational information related to the common capacitor or the first capacitor; and
a bypass shunt circuit configured to perform a switching operation based on the detection voltage.

18. The communication terminal of claim 17, wherein the operational information is determined based on a level of the node voltage.

19. The communication terminal of claim 17, wherein the operational information indicates whether one or more of the common capacitor and the first capacitor is damaged.

\* \* \* \* \*